J. B. STEELE & H. FOLLIS.
SEEDING ATTACHMENT.
APPLICATION FILED FEB. 21, 1914.

1,229,342.

Patented June 12, 1917.
2 SHEETS—SHEET 1.

WITNESSES:

INVENTORS:
John B. Steele
Hugh Follis
By _____ ATTORNEY.

J. B. STEELE & H. FOLLIS.
SEEDING ATTACHMENT.
APPLICATION FILED FEB. 21, 1914.

1,229,342.

Patented June 12, 1917.
2 SHEETS—SHEET 2.

UNITED STATES PATENT OFFICE.

JOHN BYRON STEELE AND HUGH FOLLIS, OF ORILLIA, ONTARIO, CANADA.

SEEDING ATTACHMENT.

1,229,342.  Specification of Letters Patent.  Patented June 12, 1917.

Application filed February 21, 1914. Serial No. 820,301.

*To all whom it may concern:*

Be it known that we, JOHN BYRON STEELE and HUGH FOLLIS, both subjects of the King of Great Britain, residing at Orillia, in the county of Simcoe, Province of Ontario, Dominion of Canada, have invented new and useful Improvements in Seeding Attachments, of which the following is a specification.

Our invention relates to an improved attachment for seeders and has as its principal object the provision of means whereby the furrow or drill forming elements of a seeder may be set closer together without danger of clogging.

A further object of our invention resides in the particular arrangement and combination of parts hereinafter described.

In the accompanying drawing:—

In the separate views the same part is designated by the same reference character.

Figure 1:
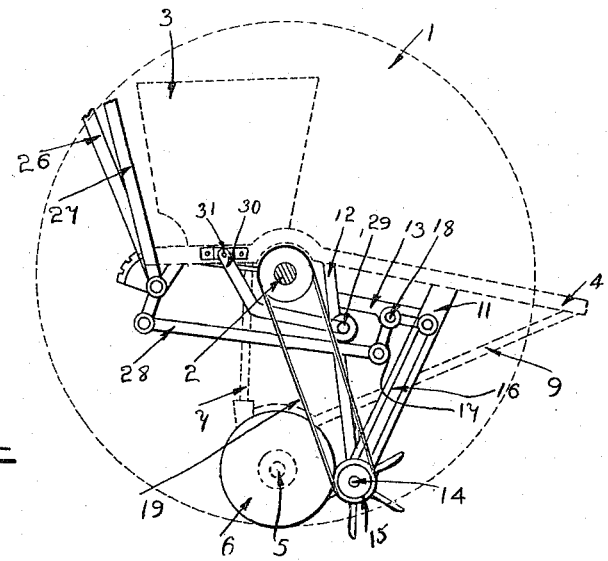
Figure 1 is a side elevational view of a seeder embodying our invention.
Figures 2, 3:
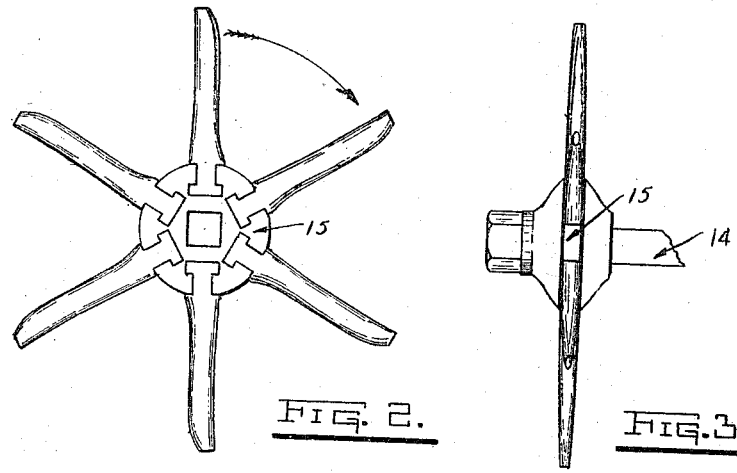
Fig. 2 is a detail view in elevation of a cleaning element forming part of our attachment.
Fig. 3 is a view taken at right angles to Fig. 2 showing one of the cleaning elements mounted on its shaft.
Figure 4:
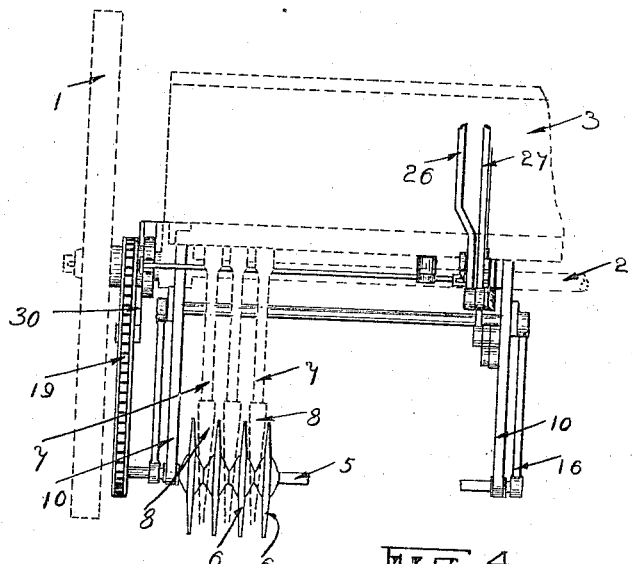
Fig. 4 is a rear view of the machine shown in Fig. 1.
Figure 5:
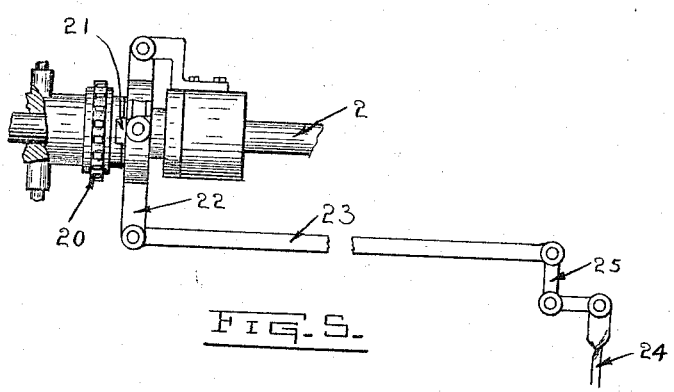
Fig. 5 is a detail showing the means of controlling the drive of the cleaning element.

Referring more particularly to the drawing, 1 represents a wheel to which there are of course two in the complete device, and 2 represents the axle of the supporting wheel 1. 3 is a hopper in which the seeds are placed and 4 represents a forwardly extending member by which the device is drawn. 5 is a shaft placed near the ground on which are mounted a number of disks 6 for the purpose of working the soil so as to receive the seeds in the usual manner. 7—7 are tubes leading down from the hopper 3 to the boots 8—8 by which the seed is deposited. 9 is a brace running from the frame member 4 to the outer boot. 10—10 are supports for the shaft 5.

Depending from the members 4 are two supports such as 11 and also two members 12 which form a V with the members 11 the members 11 and 12 being cross braced by member 13. Members 11, 12 and 13 form a rigid depending frame in which is journaled a shaft 14 on which are mounted a number of spoked wheels such as 15, one of the wheels 15 being mounted intermediate each pair of disks. The shaft 14 is journaled at the lower end of two rods 16 which are hung from bell cranks 17, the bell cranks being pivotally mounted on the brace member 13 at point such as 18. The shaft 14 and wheels 15 are rotated by means of a sprocket wheel carried by the shaft 14 at one end thereof, a chain 19 extending from the sprockets on the shaft 14 to a driving sprocket 20 carried on the axle 2 of the wheel 1, and we provide a clutch member 21 which may be of any known type for clutching the sprocket 20 to the axle 2 whenever it is desired to run the cleaning wheels 15. Links such as 22, 23 and 24 with a bell crank 25 connect the clutch 21 with an operating lever 26. The bell crank 17 by which the shaft 14 may be swung relatively to the ground, is also connected to an operating lever 27 by means of links 28. As the movement of the shaft 14 relatively to the ground might unduly slacken the sprocket chain 19, we provide a tighten-up pulley 29 which is journaled at the end of an arm 30, one end of which is journaled to the frame of the seeder near the base of the hopper as shown at 31.

In the operation of our device it will be obvious that as the supporting wheel 1 revolves the shaft 14 can be geared to the axle 2 so that the spokes of the wheel 15 revolve between each pair of disks 6 and in this way prevent all danger of clogging the disks by means of trash or damp earth. We find that on this account we can place the disks 6—6 closer together than has been the previous custom.

It will be understood that while we have shown and described the preferred form of our invention, that we do not wish to be limited to the mechanical details shown.

Having thus described our invention, what we claim is:—

1. A seeding device including an axle and supporting wheels non-revolubly mounted thereon, disks secured to said device, cleaning members provided with spokes carried by said device before said disks and having their spokes extending between adjacent disks, said members operatively connected to said axle, a clutch device carried by said axle for actuating said members and means for raising or lowering said members, substantially as described.

2. A seeding device including an axle and supporting wheels non-revolubly mounted thereon, disks secured to said device, cleaning members provided with spokes carried by said device before said disks and having their spokes extending between adjacent disks, said members operatively connected to said axle, a clutch device carried by said axle for actuating said members, and lever mechanism for raising or lowering said members as desired.

In testimony whereof we affix our signatures in the presence of two witnesses.

JOHN BYRON STEELE.
HUGH FOLLIS.

Witnesses:
MARY RIORDAN,
IRENE THORNTON.

Copies of this patent may be obtained for five cents each, by addressing the "Commissioner of Patents, Washington, D. C."